US008805156B2

(12) United States Patent
Takanezawa

(10) Patent No.: US 8,805,156 B2
(45) Date of Patent: Aug. 12, 2014

(54) RECORDING CONTROL APPARATUS AND RECORDING CONTROL METHOD

(75) Inventor: Tetsuhiro Takanezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 12/538,799

(22) Filed: Aug. 10, 2009

(65) Prior Publication Data
US 2010/0046928 A1  Feb. 25, 2010

(30) Foreign Application Priority Data

Aug. 21, 2008  (JP) ................................. 2008-213292

(51) Int. Cl.
*H04N 5/935* (2006.01)
(52) U.S. Cl.
USPC ............................. 386/210; 386/224; 386/230
(58) Field of Classification Search
USPC .......................................... 386/210, 224, 230
See application file for complete search history.

(56) References Cited

U.S. PATENT DOCUMENTS

| 7,562,380 B2* | 7/2009 | Negishi et al. ................ 725/105 |
| 2003/0152360 A1* | 8/2003 | Mukai et al. .................... 386/46 |
| 2004/0246841 A1* | 12/2004 | Miyamoto ................... 369/47.28 |
| 2006/0277226 A1* | 12/2006 | Chikusa et al. ................ 707/201 |
| 2007/0147780 A1* | 6/2007 | Moteki et al. ................... 386/95 |
| 2007/0160192 A1* | 7/2007 | Horio et al. .................... 379/338 |
| 2007/0177815 A1* | 8/2007 | Yang et al. ..................... 382/254 |
| 2008/0022061 A1* | 1/2008 | Ito et al. ......................... 711/162 |
| 2008/0231891 A1* | 9/2008 | Nakata ......................... 358/1.15 |

FOREIGN PATENT DOCUMENTS

| JP | 2005-65232 A | 3/2005 |
| JP | 2006338461 A | 12/2006 |
| JP | 2007-43446 A | 2/2007 |

* cited by examiner

*Primary Examiner* — Thai Tran
*Assistant Examiner* — Jose Mesa
(74) *Attorney, Agent, or Firm* — Fitzpatrick, Cella, Harper & Scinto

(57) ABSTRACT

First deficiency information according to a deficiency period of time-series data in a first recording unit among plural recording units and second deficiency information according to a deficiency period of time-series data in a second recording unit are obtained. Then, it is controlled to combine electronic data of a non-deficient period in the first recording unit and electronic data of a non-deficient period in the second recording unit with each other and record the combined electronic data, based on the obtained first deficiency information and the obtained second deficiency information.

25 Claims, 11 Drawing Sheets

<300: DEFICIENCY RESULT INFORMATION>

| START TIME | END TIME |
|---|---|
| 2007/11/19 10:15:31. 25 | 2007/11/19 10:16:13. 10 |
| 2007/11/19 15:30:00. 42 | 2007/11/19 15:30:21. 33 |

FIG. 5

<500: EXTRACTION INFORMATION>

| START TIME | END TIME | VIDEO RECORDING APPARATUS ID |
|---|---|---|
| 2007/11/19 00:00:00.00 | 2007/11/19 10:15:31.25 | SS1 |
| 2007/11/19 10:15:31.25 | 2007/11/19 13:21:56.33 | SS2 |
| 2007/11/19 13:21:56.33 | 2007/11/19 15:30:00.42 | SS1 |
| 2007/11/19 15:30:00.42 | 2007/11/20 00:00:00.00 | SS2 |

FIG. 6

<600: REPRODUCTION ORDER INFORMATION>

| START TIME | END TIME | FILE NAME | READING POSITION |
|---|---|---|---|
| 2007/11/19 00:00:00.00 | 2007/11/19 10:15:31.25 | SS1_01.avi | 0 |
| 2007/11/19 10:15:31.25 | 2007/11/19 13:21:56.33 | SS2_01.avi | 0 |
| 2007/11/19 13:21:56.33 | 2007/11/19 15:30:00.42 | SS1_02.avi | 0 |
| 2007/11/19 15:30:00.42 | 2007/11/20 00:00:00.00 | SS2_02.avi | 0 |

<900: EXTRACTION INFORMATION>

| START TIME | END TIME | VIDEO RECORDING APPARATUS ID |
|---|---|---|
| 2007/11/19 00:00:00.00 | 2007/11/20 00:00:00.00 | SS1 |
| 2007/11/19 10:15:31.25 | 2007/11/19 10:16:13.10 | SS2 |
| 2007/11/19 15:30:00.42 | 2007/11/19 15:30:21.33 | SS2 |

<1100: REPRODUCTION ORDER INFORMATION>

| START TIME | END TIME | FILE NAME | READING POSITION |
|---|---|---|---|
| 2007/11/19 00:00:00.00 | 2007/11/19 10:15:31.25 | SS1_01.avi | 0 |
| 2007/11/19 10:15:31.25 | 2007/11/19 10:16:13.10 | SS2_01.avi | 0 |
| 2007/11/19 10:16:13.10 | 2007/11/19 15:30:00.42 | SS1_01.avi | 3693125 |
| 2007/11/19 15:30:00.42 | 2007/11/19 15:30:21.33 | SS2_02.avi | 0 |
| 2007/11/19 15:30:21.33 | 2007/11/20 00:00:00.00 | SS1_01.avi | 5582133 |

RECORDING CONTROL APPARATUS AND RECORDING CONTROL METHOD

BACKGROUND OF THE INVENTION

1. Field of the Invention

The present invention relates to a recording control apparatus and a recording control method which record time-series electronic data (or time-series data), a program which is used to cause a computer to perform the recording control method, and a computer-readable storage medium which has stored therein the program.

2. Description of the Related Art

Conventionally, as a method of improving maintainability of electronic data recorded, a method of storing electronic data in a redundant-constitution storage medium such as a RAID {Redundant Arrays of Inexpensive (or Independent) Disks} or the like and a method of copying (duplicating) electronic data in another storage medium have been generally used. Moreover, as a method of reducing the capacity of electronic data recorded on a storage medium, a method of searching for redundant fillies of the same content and deleting them has been generally used (for example, Japanese Patent Application Laid-Open No. 2006-338461).

However, in the conventional method of storing the electronic data on the redundant-constitution storage medium, if an error is included in the electronic data due to concentration of various loads or the like in the process of generation of the electronic data to be recorded, the error is resultingly included in the electronic data stored on each of the redundant-constitution storage media. In this case, only by setting the storage medium of one recording apparatus to have the redundant constitution, it is impossible to obtain sufficient maintainability of the electronic data. For this reason, in order to improve maintainability in a system of recording electronic data such as video data and the like, the system itself is constituted by achieving redundancy by providing plural recording apparatuses themselves.

However, in such a case, there is a possibility that the electronic data of the respective recording apparatuses include errors in mutually different periods. For this reason, since each recording apparatus has to hold all the electronic data, there is a problem that a capacity which is necessary for the recording medium of each recording apparatus has to be large.

SUMMARY OF THE INVENTION

The present invention has been completed in consideration of the above-described related art, and aims to secure maintainability of electronic data and also achieve reduction of a capacity necessary for a storage medium to which the electronic data is copied.

According to an aspect of the present invention, there is provided a recording control apparatus which controls recording of time-series data transmitted from a transmission apparatus to plural recording units, the recording control apparatus comprising: an obtaining unit configured to obtain first deficiency information according to a deficiency period of the time-series data in a first recording unit, and second deficiency information according to a deficiency period of the time-series data in a second recording unit; and a recording control unit configured to control to combine data of a non-deficient period in the first recording unit and data of a non-deficient period in the second recording unit with each other and record the combined data, based on the first deficiency information and the second deficiency information obtained by the obtaining unit.

Further features of the present invention will become apparent from the following description of the exemplary embodiments with reference to the attached drawings.

BRIEF DESCRIPTION OF THE DRAWINGS

FIG. 5 is a diagram illustrating an example of extraction information generated in the electronic data recording process illustrated in FIG. 4.

FIG. 6 is a diagram illustrating an example of reproduction order information generated in the electronic data recording process illustrated in FIG. 4.

DESCRIPTION OF THE EMBODIMENTS

Hereinafter, the exemplary embodiments of the present invention will be described with reference to the attached drawings. Here, it should be noted that, in each of the following embodiments, a video recording apparatus is applied as an example of a recording apparatus according to the present invention.

Initially, the first embodiment of the present invention will be described.

Figure 1:
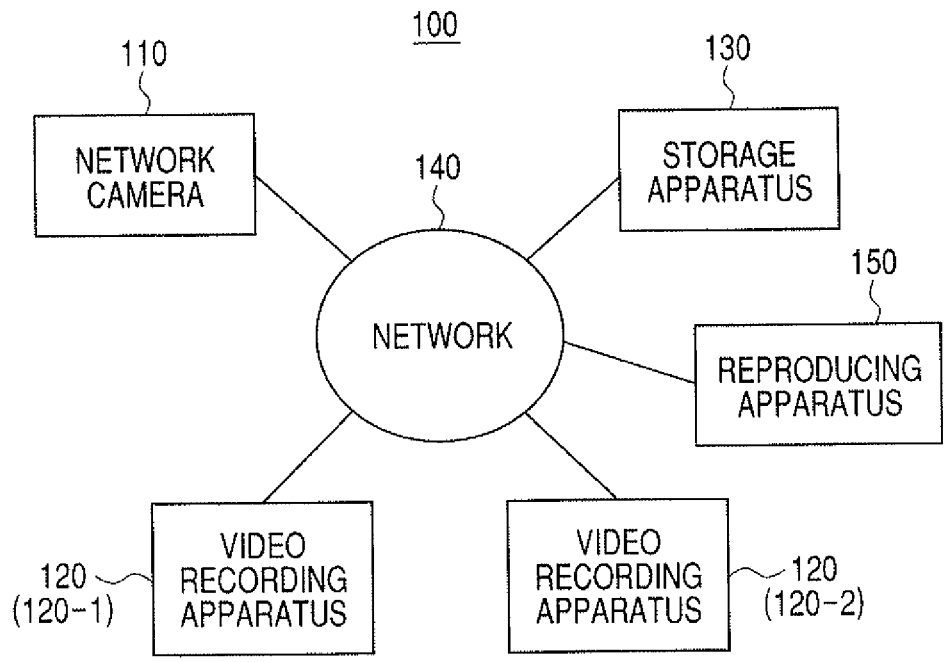
FIG. 1 is a block diagram illustrating an example of the overall configuration of an electronic data recording system according to the first embodiment of the present invention.

FIG. 1 is a block diagram illustrating an example of the overall configuration of an electronic data recording system 100 according to the first embodiment of the present invention.

In FIG. 1, the electronic data recording system 100 includes a network camera 110, video recording apparatuses 120, a storage apparatus 130, a network 140, and a reproducing apparatus 150.

The network camera 110 is the delivery apparatus which generates video data or the like as time-series electronic data, and delivers the generated video data or the like to the network 140. In the electronic data recording system 100, at least one network camera 110 is provided, but plural network cameras may be provided. Here, the network camera 110 may generate, as the time-series electronic data, audio data, detection data transferred by a sensor such as a temperature indicator or the like, and the like in addition to the video data, and may deliver the generated data to the network 140.

Each of the video recording apparatuses 120 records the video data (time-series electronic data) delivered from the network camera 110 through the network 140. In the electronic data recording system 100 illustrated in FIG. 1, the plural video recording apparatuses are provided. More specifically, in the electronic data recording system 100, two video recording apparatuses 120-1 and 120-2 are provided as the plural video recording apparatuses 120. However, three or more video recording apparatuses may be provided.

The storage apparatus 130 is the storage apparatus (storage medium) in which various kinds of data and the like are stored.

The storage apparatus 130 may be the storage apparatus such as "Network_Attached_Storage" or the like which is connected to the network 140. Alternatively, the storage apparatus 130 may be the storage apparatus which is connected to the video recording apparatuses 120-1 and 120-2 in the network 140 such as "Storage_Area_Network" or the like. Further, the storage apparatus 130 may be the storage apparatus such as a tape, a hard disk, an optical disk or the like which is provided in the video recording apparatus 120-1 or 120-2.

The network 140 communicably connects the network camera 110, the video recording apparatuses 120 and the storage apparatus 130 with others. Here, it should be noted that the network 140 need not necessarily be a single network. For example, the network 140 may includes independently a network for connecting the network camera 110 and the video recording apparatuses 120-1 and 120-2 with others and a network for connecting the storage apparatus 130 and the video recording apparatuses 120-1 and 120-2 with others.

The reproducing apparatus 150 is the apparatus which reproduces and displays the video data stored in the storage apparatus 130. More specifically, the reproducing apparatus 150 is constituted by a display unit for displaying the video data, and a general personal computer such as a processor or the like for causing the display unit to display the video data.

Figure 2:
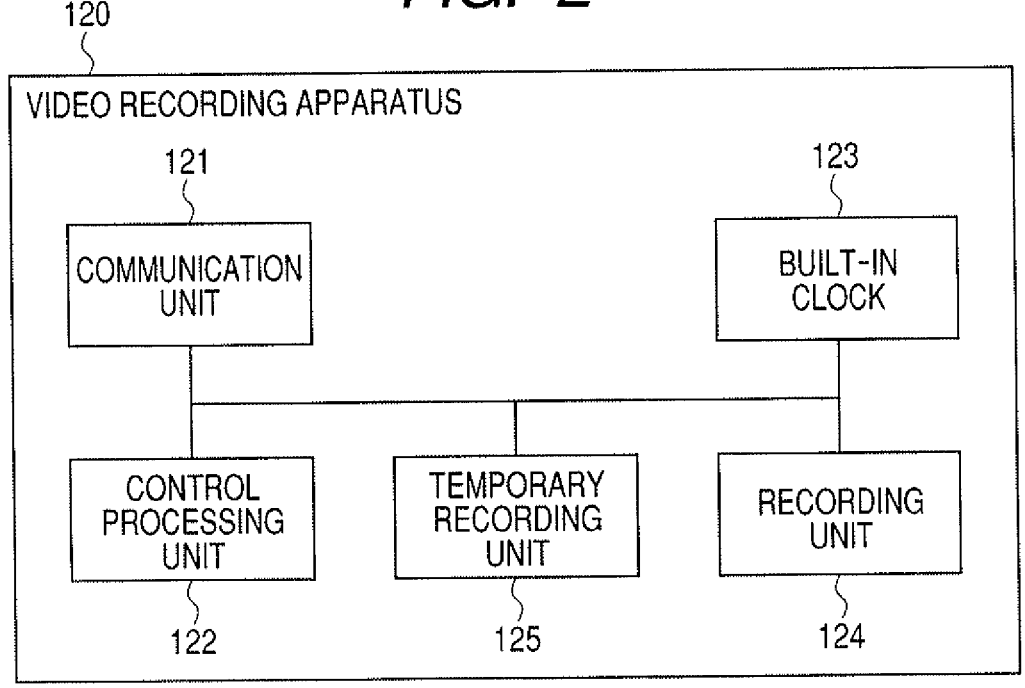
FIG. 2 is a block diagram illustrating an example of the internal constitution of a video recording apparatus illustrated in FIG. 1.

FIG. 2 is a block diagram illustrating an example of the internal constitution of the video recording apparatus 120 illustrated in FIG. 1.

As illustrated in FIG. 2, the video recording apparatus 120 illustrated in FIG. 1 is constituted by a communication unit 121, a control processing unit 122, a built-in clock 123, a recording unit 124, and a temporary recording unit 125.

More specifically, the communication unit 121 performs communication with another apparatus (external apparatus) through the network 140, under the control of the control processing unit 122.

The control processing unit 122 wholly controls the video recording apparatus 120, and performs arithmetic operations. For example, the control processing unit 122 is constituted by a CPU (central processing unit) or the like.

The built-in clock 123, which is provided inside the video recording apparatus 120, performs time of day control. For example, the built-in clock 123 performs synchronization by communicating with the other video recording apparatus 120 or a not-illustrated NTP (network time protocol) server through the communication unit 121. In this regard, the built-in clock 123 may set the time by, for example, receiving a standard frequency broadcast through the communication unit 121. In any case, in the electronic data recording system 100 according to the present embodiment, the times respectively indicated by the built-in clocks 123 in the video recording apparatuses 120 (i.e., the video recording apparatuses 120-1 and 120-2) are the same.

The recording unit 124 records various data, various information and the like. For example, the recording unit 124 is constituted by a hard disk, an optical disk, a memory card or the like.

The temporary recording unit 125 temporarily stores various programs, various data and the like. For example, the temporary recording unit 125 is constituted by a RAM (random access memory) or the like.

Figures 3, 4:
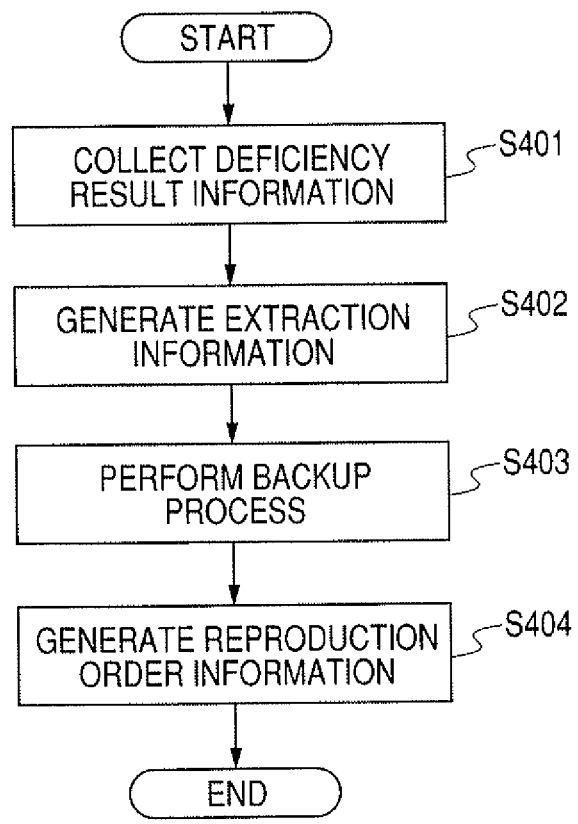
FIG. 3 is a diagram illustrating an example of deficiency result information recorded in the recording unit illustrated in FIG. 2.
FIG. 4 is a flow chart indicating an example of an electronic data recording process to be performed by the video recording apparatus illustrated in FIG. 1.

FIG. 3 is a diagram illustrating an example of deficiency result information 300 recorded in the recording unit 124 illustrated in FIG. 2.

The video recording period list in the deficiency result information 300 illustrated in FIG. 3 includes the items respectively indicating start time and end time, and thus indicates that a deficiency is included in the video data recorded during a period indicated by the start time and the end time in the respective items.

Subsequently, a process in which the video recording apparatuses 120 (the video recording apparatuses 120-1 and 120-2) in the electronic data recording system 100 illustrated in FIG. 1 record the video data which are electronic data will be described with reference to FIGS. 2 and 3.

Setting information (an address of the target network camera 110, a schedule to be executed, a size of the video data, quality of the video data, and a frame rate of the video data) for the video data in the network camera 110 is obtained by the respective video recording apparatuses 120 and stored in the respective recording units 124 thereof. Here, the video recording apparatus 120-1 and the video recording apparatus 120-2 synchronize the contents of the setting information from the network camera 110 by mutually communicating with each other.

The control processing units 122 of the respective video recording apparatuses 120 read the setting information recorded in the recording units 124 of the respective video recording apparatuses 120, and thus generate video obtaining commands for the network camera 110. Subsequently, the respective control processing units 122 transmit the generated video obtaining commands to the network camera 110 through the respective communication units 121, obtain the video data from the network camera 110, and then store the obtained video data in the respective temporary recording units 125. After then, the respective control processing units 122 add, to the video data stored in the respective temporary recording units 125, the time information of the respective built-in clocks 123, the time information added to the obtained respective video data, or the time information calculated from the time information of the respective built-in clocks 123 and the time information added to the obtained respective video data, and subsequently record and store the video data and the time information in the respective recording units 124.

Further, the respective control processing units 122 analyze the video data recorded in the respective recording units 124, judge differences between the video data and the settings of the setting information concerning the obtaining of the video data, obtain the deficiency result information 300 from the judged results and the results of the recording processes, and then store the obtained information in the respective recording units 124. Here, the target to be compared based on the analysis of the video data may be any one of the information concerning presence/absence of the video data, the information concerning the frame rate, the information concerning the size of the video data, and the information concerning the quality of the video data, or may be a combination of these information.

In other words, each of the video recording apparatuses 120-1 and 120-2 receives the video data from the network camera 110, records the received video data in the recording unit 124, generates the deficiency result information 300 based on the recorded video data, and records the generated deficiency result information 300 in the recording unit 124. In this regard, in a case where each of the video recording apparatuses 120 records the video data from the plural network cameras 110, the video recording apparatus 120 records the video data from each of the network cameras, generates the deficiency result information 300 corresponding to each video data recorded, and records the generated deficiency result information 300 in the recording unit 124.

Subsequently, in the electronic data recording system 100 illustrated in FIG. 1, a process of backing up the video data recorded in the video recording apparatuses 120-1 and 120-2 to the storage apparatus 130 will be described with reference to FIGS. 4 to 6.

FIG. 4 is a flow chart indicating an example of an electronic data recording process to be performed by the video recording apparatus 120 illustrated in FIG. 1. The electronic data recording process (i.e., a backup process) illustrated in FIG. 4 is performed when either one of the video recording apparatus 120-1 and the video recording apparatus 120-2 acts as a host apparatus. More specifically, the backup process is performed by the control processing unit 122 of the video recording apparatus 120 which acts as the host apparatus.

FIG. 5 is a diagram illustrating an example of extraction information 500 generated in the electronic data recording process illustrated in FIG. 4, and FIG. 6 is a diagram illustrating an example of reproduction order information 600 generated in the electronic data recording process illustrated in FIG. 4.

Before the process illustrated in FIG. 4 is started, the control processing unit 122 of the video recording apparatus 120 performs a process of inspecting whether or not there is a deficiency of the electronic data recorded in the own apparatus and then generating deficiency result information (e.g., the deficiency result information 300 illustrated in FIG. 3) concerning a period of the deficiency of the relevant electronic data. More specifically, in the process of judging whether or not there is the deficiency of the electronic data, the control processing unit 122 holds and refers to history information concerning whether or not the connection between the network camera 100 and the video recording apparatus 120 is established, and judges a time when a connection error occurs as the deficiency of the electronic data.

Moreover, as a method of judging the deficiency of the electronic data, the control processing unit 122 adopts a method of detecting a time when a frame rate of the electronic data (video data) previously set in the video recording apparatus is different from the frame rate actually received, and judging the detected time as the deficiency of the electronic data. In any case, the control processing unit 122 which performs the process of generating the deficiency result information constitutes a deficiency result information generation means.

In a case where an operation instruction is issued from a user or in a case where a time set for execution of the schedule comes, the video recording apparatus 120 (the video recording apparatus 120-1 or the video recording apparatus 120-2) performs the process illustrated in FIG. 4 if, for example, the status of the relevant video recording apparatus satisfies a certain condition. In any case, the range of the electronic data (for example, the video data) which is the target of the backup process is represented by a time range based on the recording time of the electronic data, and designated by the user, a relative time based on the schedule, or a difference from the previous-time backup.

Initially, in a step S401 of FIG. 4, the control processing unit 122 of the video recording apparatus 120 (for example, the video recording apparatus 120-1) which performs the backup process reads the deficiency result information 300 from the recording unit 124 in the own apparatus. Further, the control processing unit 122 of the video recording apparatus 120 which performs the backup process obtains and reads, from the other video recording apparatus (for example, the video recording apparatus 120-2) which performs the same operation, the deficiency result information 300 of the other video recording apparatus. That is, the control processing unit 122 of the video recording apparatus 120 which performs the backup process collects the deficiency result information 300 of the own apparatus, and at the same time collects through the network 140 the deficiency result information 300 of the other video recording apparatus 120 which performs the same operation. The control processing unit 122 which performs the process in the step S401 constitutes a deficiency result information collecting means.

Subsequently, in a step S402, the control processing unit 122 of the video recording apparatus 120 which performs the backup process performs a process of generating the extraction information based on the deficiency result information 300 read in the step S401. More specifically, in the step S402, as illustrated in FIG. 5, the extraction information 500 which includes the information of the start time and the end time of extracting the recorded electronic data (video data) and the information indicating an video recording apparatus ID uniquely identifying the video recording apparatus which performs the recording is generated. Here, in the video recording apparatus ID illustrated in FIG. 5, a symbol SS1 indicates a first video recording apparatus which is selected from the plural video recording apparatuses, that is, the video recording apparatuses 120-1 and 120-2, and a symbol SS2 indicates a second video recording apparatus (the other video recording apparatus) which is not selected. The control processing unit 122 which performs the process in the step S402 constitutes an extraction information generation means. In any case, the detailed process in the step S402 will be described later.

Subsequently, in a step S403, the control processing unit 122 of the video recording apparatus 120 which performs the backup process performs the backup process (a duplication process) of the electronic data recorded in each video recording apparatus, based on the extraction information generated in the step S402. More specifically, in a case where the own apparatus is present in the video recording apparatus ID included in the extraction information, the relevant control processing unit 122 extracts the electronic data in the period from the designated start time to the designated end time recorded in the recording unit 124 of the own apparatus, and stores the extracted electronic data in the storage apparatus 130. Further, in a case where the other apparatus is present in the video recording apparatus ID included in the extraction information, the relevant control processing unit 122 issues, to the other video recording apparatus, an instruction to extract the electronic data from the designated start time to the designated end time recorded in the relevant recording unit 124 and store the extracted electronic data in the storage apparatus 130. In this case, the relevant control processing unit 122 issues the above-described instruction to the control processing unit 122 of the other video recording apparatus. That is, on the basis of the extraction information, the relevant control processing unit 122 extracts the electronic data in the period which does not include the period of deficiency from the electronic data recorded in each video recording apparatus 120, and performs the backup process (the duplication process) of the extracted electronic data (extraction data). The control processing unit 122 which performs the process in the step S403 constitutes a duplication processing means.

Subsequently, in a step S404, the control processing unit 122 of the video recording apparatus 120 which performs the backup process performs a process of generating the reproduction order information on the basis of the extraction information and the results of the storage of the respective electronic data in the storage apparatus 130. As illustrated in FIG. 6, the reproduction order information 600 generated in the step S404 includes the information indicating the start time and the end time, the information indicating the file name, and the information indicating the file reading position, so as to access the electronic data stored in the storage apparatus 130 in a time series manner. The reading position illustrated in FIG. 6 indicates a capacity (bytes) from the head of the file. Further, the respective electronic data (the respective extraction data) indicated by the reproduction order information 600 are sequentially switched and reproduced for each period from the start time to the end time. Furthermore, the reproduction order information 600 generated in the step S404 is stored in the storage apparatus 130. That is, the relevant control processing unit 122 performs a process of generating, for example, the reproduction order information illustrated in FIG. 6 which indicates the time-series relations of the plural electronic data duplicated in the storage apparatus 130, on the basis of the extraction information, the results of the duplication of the electronic data (the extraction data) in the step S403, and the like. The control processing 122 which performs the process in the step S404 constitutes a reproduction order information generation means.

Incidentally, in a case where each of the video recording apparatuses 120 records the video data transmitted from the plural network cameras 110 and backs up the recorded video data, the processes in the above-described steps S401 to S404 are performed for the video data of each of the network cameras 110. In this regard, it is possible in the step S401 to generate the deficiency result information by analyzing the electronic data recorded in each of the video recording apparatuses for each process and collect the generated deficiency result information. Further, in case of causing each of the video recording apparatuses to generate the deficiency result information, it is unnecessary to generate and record the deficiency result information in the video recording process of each of the video recording apparatuses.

Subsequently, in the first embodiment of the present invention, the extraction information generating process in the step S402 of FIG. 4 and the reproduction order information generating process in the step S404 of FIG. 4 will be described in detail with reference to FIGS. 7 to 11.

First, the extraction information generating process in the step S402 of FIG. 4 will be described in detail.

Figure 7:
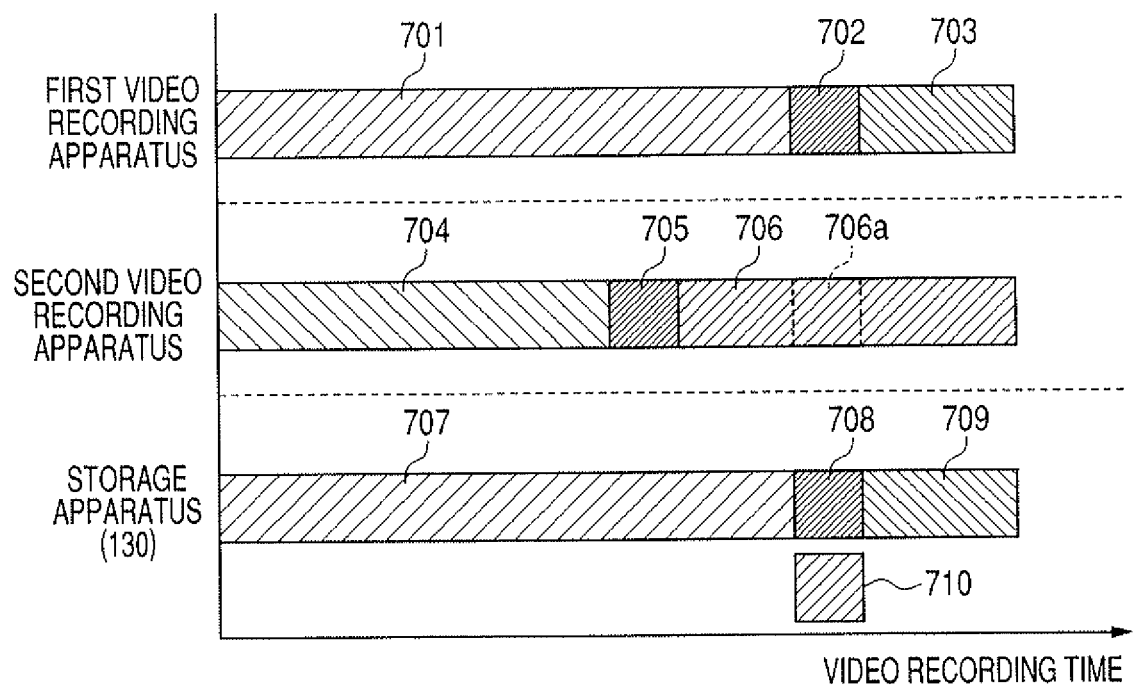
FIG. 7, indicating the first embodiment of the present invention, is a diagram schematically illustrating an example of a result of the extraction information in the electronic data recording system illustrated in FIG. 1.

FIG. 7, indicating the first embodiment of the present invention, is a diagram schematically illustrating an example of a result of the extraction information in the electronic data recording system 100 illustrated in FIG. 1.

In FIG. 7, the axis of abscissas indicates a video recording time. More specifically, in FIG. 7, after the backup process in the step S403, the electronic data (video data) which are recorded respectively in the first video recording apparatus, the second video recording apparatus and the storage apparatus 130 are indicated as respective bars.

In the first video recording apparatus, the electronic data in the time zones indicated by zones 701 and 703 are the normal electronic data, and the electronic data in the time zone indicated by a zone 702 is the electronic data including deficiency. In the second video recording apparatus, the electronic data in the time zones indicated by zones 704 and 706 are the normal electronic data, and the electronic data in the time zone indicated by a zone 705 is the electronic data including deficiency.

In the storage apparatus 130, the electronic data indicated by zones 707, 708 and 709 are respectively the same as the electronic data indicated by the zones 701, 702 and 703 and recorded in the first video recording apparatus. Under the circumstances, in regard to the electronic data in the time zone indicated by the zone 708 including the deficiency, electronic data 710 which is obtained by extracting the electronic data (706*a*) in the corresponding time zone from the second video recording apparatus is recorded in the storage apparatus 130.

Figure 8:
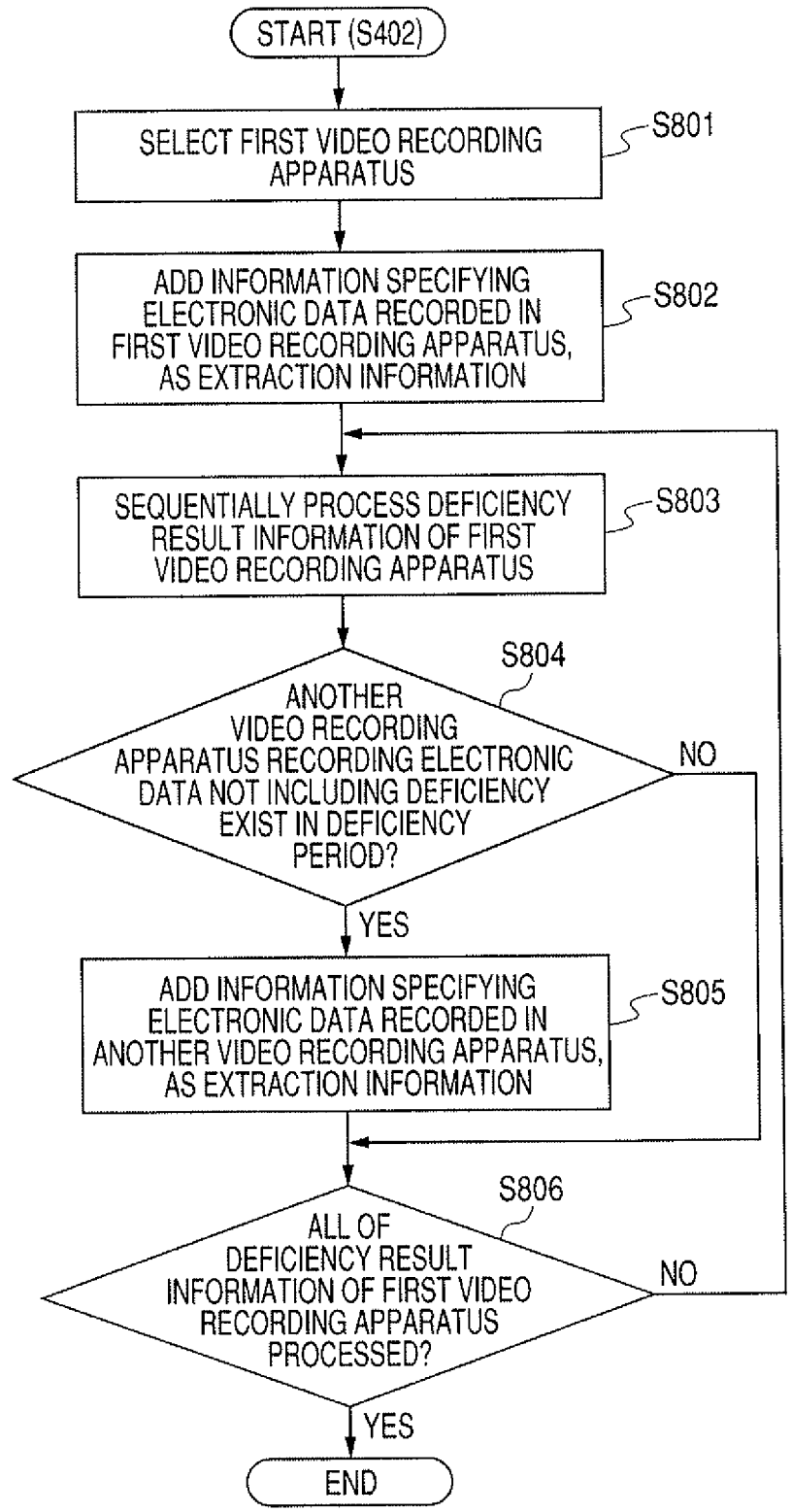
FIG. 8, indicating the first embodiment of the present invention, is a flow chart indicating an example of a detailed process of an extraction information generating process in the step S402 of FIG. 4.

FIG. 8, indicating the first embodiment of the present invention, is a flow chart indicating an example of a detailed process of the extraction information generating process in the step S402 of FIG. 4.

In the process of the step S402 illustrated in FIG. 4, initially, in a step S801 of FIG. 8, the control processing unit 122 of the video recording apparatus 120 which performs the backup process selects the first video recording apparatus (a first recording apparatus) from the plural video recording apparatuses 120 which perform the same operation. In the present embodiment, the first video recording apparatus is selected from the video recording apparatuses 120-1 and 120-2 which are equivalent to the plural video recording apparatuses 120 which perform the same operation.

More specifically, the following aspects are conceivable as the process of selecting the first video recording apparatus in the step S801.

According to the first aspect, from the plural video recording apparatuses 120 which perform the same operation, the video recording apparatus in which the period including the deficiency is shortest in the period of the backup process is selected as the first video recording apparatus.

According to the second aspect, from the plural video recording apparatuses 120 which perform the same operation, the video recording apparatus in which the number of the periods respectively including the deficiencies is least in the period of the backup process is selected as the first video recording apparatus.

According to the third aspect, from the plural video recording apparatuses 120 which perform the same operation, the video recording apparatus in which the interval from the start time of the period of the backup process to the period including the deficiency is longest is selected as the first video recording apparatus.

According to the fourth aspect, from the plural video recording apparatuses 120 which perform the same operation, the video recording apparatus in which a load to the storage apparatus 130 consisting of a storage such as a hard disk or the like is least is selected as the first video recording apparatus.

According to the fifth aspect, from the plural video recording apparatuses 120 which perform the same operation, the video recording apparatus in which a load to the relevant video recording apparatus is least is selected as the first video recording apparatus. Here, as the load in case of selecting the first video recording apparatus, for example, it is possible to apply a load to CPU utilization concerning the control processing unit 122, a load to memory utilization concerning the recording unit, a load due to a used band of the network, or a combination of these loads. Further, as the load in case of selecting the first video recording apparatus, for example, it is possible to use a load which is measured from a state of reading or writing from or to the recording unit 124 of recording the electronic data.

Subsequently, in a step S802, the control processing unit 122 of the video recording apparatus 120 which performs the backup process performs a process of adding, as the extraction information, information for specifying the electronic data recorded in the first video recording apparatus selected in the step S801. More specifically, the information from the start time to the end time of the time zone of the electronic data to be subjected to the backup process, and the information (video recording apparatus ID) for specifying the first video recording apparatus selected in the step S801 are added as the extraction information.

Subsequently, in a step S803, the control processing unit 122 of the video recording apparatus 120 which performs the backup process sequentially performs the process for each deficiency period included in the time zone of the backup process, based on the deficiency result information in the first video recording apparatus selected in the step S801.

Subsequently, in a step S804, the control processing unit 122 of the video recording apparatus 120 which performs the backup process judges whether or not another video recording apparatus which records the electronic data not including deficiency exists in the deficiency period in which the process by the first video recording apparatus is performed.

If it is judged in the step S804 that another video recording apparatus which records the electronic data not including deficiency exists (YES in the step S804), the flow advances to a step S805. In the step S805, the control processing unit 122 of the video recording apparatus 120 which performs the backup process performs a process of adding, as the extraction information, information for specifying the electronic data recorded in the relevant another video recording apparatus judged in the step S804. More specifically, the information from the start time to the end time in the deficiency period in which the process is performed, and the information (video recording apparatus ID) for specifying the relevant another video recording apparatus judged in the step S804 are added as the extraction information.

If the process in the step S805 ends, or if it is judged in the step S804 that another video recording apparatus which records the electronic data not including deficiency does not exist (NO in the step S804), the flow advances to a step S806. In the step S806, the control processing unit 122 of the video recording apparatus 120 which performs the backup process judges whether or not the process is performed for all of the deficiency periods based on the deficiency result information of the first video recording apparatus, included in the time zone of the backup process.

Then, if it is judged in the step S806 that the process is not performed for all of the deficiency periods, that is, if the deficiency result information which is not processed yet exists (NO in the step S806), the flow returns to the step S803. Thus, the processes in the step S803 and the following steps are performed again.

On the other hand, if it is judged in the step S806 that the process is performed for all of the deficiency periods (YES in the step S806), the process in this flow chart ends.

In any case, the extraction information generating process in the step S402 of FIG. 4 is performed through the above-described processes in the steps S801 to S806.

Figures 9, 10:
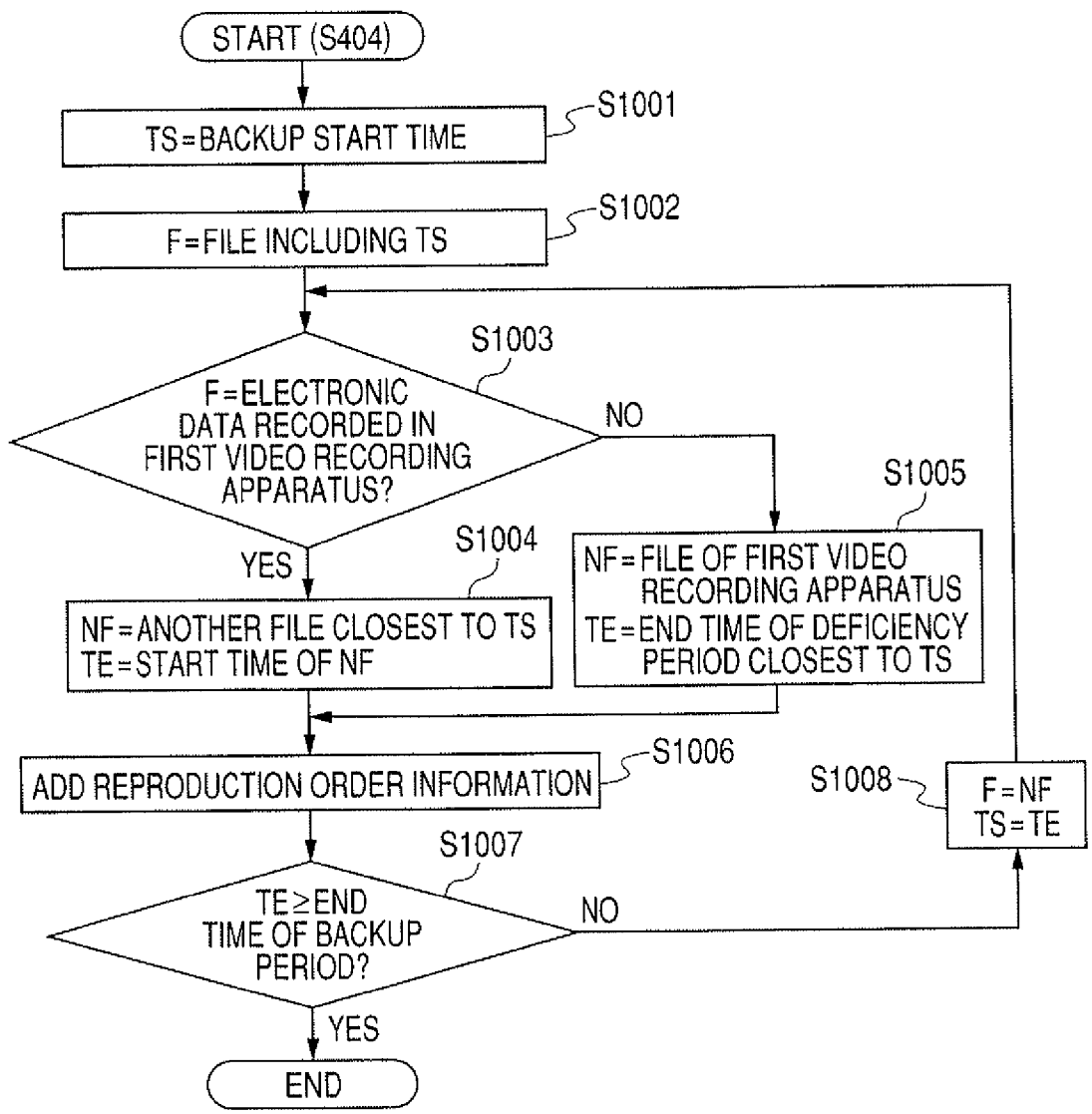
FIG. 9 is a diagram illustrating an example of the extraction information generated in the process of the flow chart illustrated in FIG. 8.
FIG. 10, indicating the first embodiment of the present invention, is a flow chart indicating an example of a detailed process of a reproduction order information generating process in the step S404 of FIG. 4.

FIG. 9 is a diagram illustrating an example of extraction information 900 generated in the process of the flow chart illustrated in FIG. 8. Here, the period of the backup process is equivalent to a day from 0 o'clock Nov. 19, 2007 to 0 o'clock Nov. 20, 2007. In the extraction information 900 illustrated in FIG. 9, the video recording apparatus specified by SS1 is selected as the first video recording apparatus. Moreover, in the extraction information 900 illustrated in FIG. 9, in regard to the first video recording apparatus specified by SS1, the two periods each of which includes a deficiency exist in the period of the backup process. In these periods, it is set to extract the electronic data from the second video recording apparatus specified by SS2.

Subsequently, the reproduction order information generating process in the step S404 of FIG. 4 will be described in detail.

FIG. 10, indicating the first embodiment of the present invention, is a flow chart indicating an example of a detailed process of the reproduction order information generating process in the step S404 of FIG. 4.

In the reproduction order information generating process in the step S404 of FIG. 4, initially in a step S1001 of FIG. 10, the control processing unit 122 of the video recording apparatus 120 which performs the backup process performs a process of setting a process start time (TS) as the start time of the backup process.

Subsequently, in a step S1002, the control processing unit 122 of the video recording apparatus 120 which performs the backup process performs a process of setting a file name of the electronic data including video recording at the time TS as "F".

Subsequently, in a step S1003, the control processing unit 122 of the video recording apparatus 120 which performs the backup process judges whether or not the electronic data "F" set in the step S1002 is the electronic data recorded in the first video recording apparatus selected in the above-described extraction information generation process.

If it is judged in the step S1003 that the electronic data "F" set in the step S1002 is the electronic data recorded in the first video recording apparatus (YES in the step S1003), the flow advances to a step S1004. In the step S1004, the control processing unit 122 of the video recording apparatus 120 which performs the backup process performs a process of setting a file of the electronic data of which the start time is later than the time TS and closest to the time TS as a next file candidate (NF), and further performs a process of setting the end time (TE) of the relevant file as the start time of the next file candidate (NF).

On the other hand, if it is judged in the step S1003 that the electronic data "F" set in the step S1002 is not the electronic data recorded in the first video recording apparatus (NO in the step S1003), the flow advances to a step S1005. In the step S1005, the control processing unit 122 of the video recording apparatus 120 which performs the backup process performs a process of setting the next file candidate (NF) as the file of the electronic data of the first video recording apparatus, and further performs a process of setting the end time (TE) of the relevant file as the end time of the deficiency period, in the deficiency result information of the first video recording apparatus, which is later than the time TS and closest to the time TS.

If the process in the step S1004 or the step S1005 ends, the flow advances to a step S1006. In the step S1006, the control processing unit 122 of the video recording apparatus 120 which performs the backup process performs a process of adding the reproduction order information. More specifically, in this process, the position of the electronic data (video data) corresponding to the start time (TS) in the file F is calculated, the calculated result is set as the reading position, and a plurality of information indicating the start time (TS), the end time (TE) and the file name (F) is together added to the reproduction order information.

Subsequently, in a step S1007, the control processing unit 122 of the video recording apparatus 120 which performs the backup process judges whether or not the end time (TE) is the same as or later than the end time of the period of the backup process.

If it is judged in the step S1007 that the end time (TE) is not the same as or later than the end time of the period of the backup process (NO in the step S1007), the flow advances to a step S1008. In the step S1008, the control processing unit 122 of the video recording apparatus 120 which performs the backup process performs a process of setting the next file candidate (NF) as the file name (F) of the electronic data, and further performs a process of setting the end time (TE) as the process start time (TS). After then, the flow returns to the step S1003, and the processes in the step S1003 and the following steps are performed again.

On the other hand, if it is judged in the step S1007 that the end time (TE) is the same as or later than the end time of the period of the backup process (YES in the step S1007), the process in this flow chart ends.

In any case, the reproduction order information generating process in the step S404 of FIG. 4 is performed through the above-described processes in the steps S1001 to S1008. The generated reproduction order information is stored together with the video data in the storage apparatus 130. Then, the reproducing apparatus 150 causes the display unit to display the video data by referring to the reproduction order information.

Figures 11, 12:
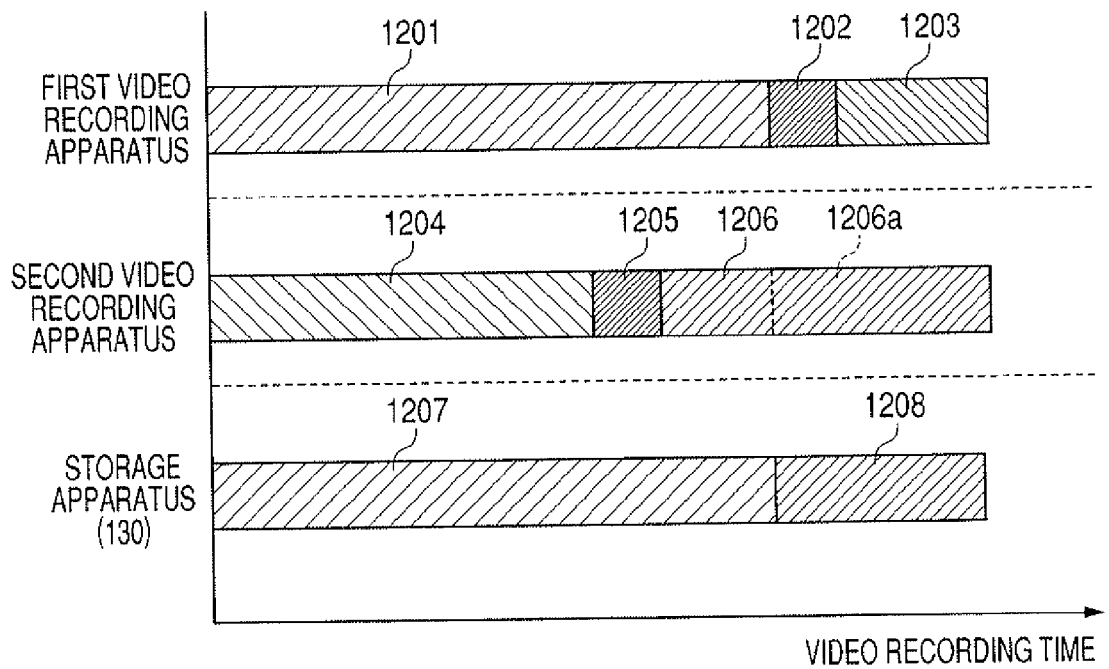
FIG. 11 is a diagram illustrating an example of the reproduction order information generated in the process of the flow chart illustrated in FIG. 10.
FIG. 12, indicating the second embodiment of the present invention, is a diagram schematically illustrating an example of a result of extraction information in the electronic data recording system illustrated in FIG. 1.

FIG. 11 is a diagram illustrating an example of reproduction order information 1100 generated in the process of the flow chart illustrated in FIG. 10. Here, the period of the backup process is equivalent to a day from 0 o'clock Nov. 19, 2007 to 0 o'clock Nov. 20, 2007.

In the reproduction order information 1100 illustrated in FIG. 11, the file of the electronic data (video data) recorded in the first video recording apparatus is specified by "SS1_01.avi", and the electronic data of the overall period of the backup process are extracted. Further, in the reproduction order information 1100, the two periods respectively including deficiencies are set to refer to "SS2_01.avi" and "SS2_02.avi" which are the files of the electronic data (video data) recorded in the other video recording apparatus (that is, the second video recording apparatus). Furthermore, after the end of each deficiency period, in the file "SS1_01.avi" of the electronic data (video data) recorded in the first video recording apparatus, the reading position for reading the corresponding position is set in the reproduction order information 1100. Incidentally, the reading position illustrated in FIG. 11 indicates a capacity (bytes) from the head of the file.

Subsequently, the second embodiment of the present invention will be described.

The overall configuration of an electronic data recording system according to the second embodiment is the same as the overall configuration of the electronic data recording system 100 according to the first embodiment illustrated in FIG. 1. Further, the internal constitution of a video recording apparatus 120 according to the second embodiment is the same as the internal constitution of the video recording apparatus 120 according to the first embodiment illustrated in FIG. 2. Furthermore, a procedure in an electronic data recording process to be performed by the video recording apparatus 120 according to the second embodiment is the same as the procedure in the electronic data recording process to be performed by the video recording apparatus 120 according to the first embodiment illustrated in FIG. 4.

In the second embodiment, the points different from those in the above-described first embodiment will be mainly described, and the descriptions of the points common to those in the first embodiment will be omitted or simplified.

Subsequently, in the second embodiment of the present invention, an extraction information generating process in the step S402 of FIG. 4 and a reproduction order information generating process in the step S404 of FIG. 4 will be described in detail with reference to FIGS. 12, 13 and 14 and FIGS. 5 and 6.

Initially, the extraction information generating process in the step S402 of FIG. 4 will be described in detail.

FIG. 12, indicating the second embodiment of the present invention, is a diagram schematically illustrating an example of a result of extraction information in the electronic data recording system 100 illustrated in FIG. 1.

In FIG. 12, the axis of abscissas indicates a video recording time. More specifically, in FIG. 12, after the backup process in the step S403, the electronic data (video data) which are recorded respectively in a first video recording apparatus, a second video recording apparatus and a storage apparatus 130 are indicated as respective bars.

In the first video recording apparatus, the electronic data in the time zones indicated by zones 1201 and 1203 are the normal electronic data, and the electronic data in the time zone indicated by a zone 1202 is the electronic data including deficiency. In the second video recording apparatus, the electronic data in the time zones indicated by zones 1204 and 1206 are the normal electronic data, and the electronic data in the time zone indicated by a zone 1205 is the electronic data including deficiency.

The electronic data indicated by a zone 1207 which is the same as the electronic data indicated by the zone 1201 and recorded in the first video recording apparatus is recorded in the storage apparatus 130. Under the circumstances, in regard to the electronic data in and after the time zone indicated by the zone 1202 including the deficiency concerning the first video recording apparatus, electronic data 1208 which is obtained by extracting the electronic data (1206a) in the corresponding time zone from the second video recording apparatus is recorded in the storage apparatus 130.

Figure 13:
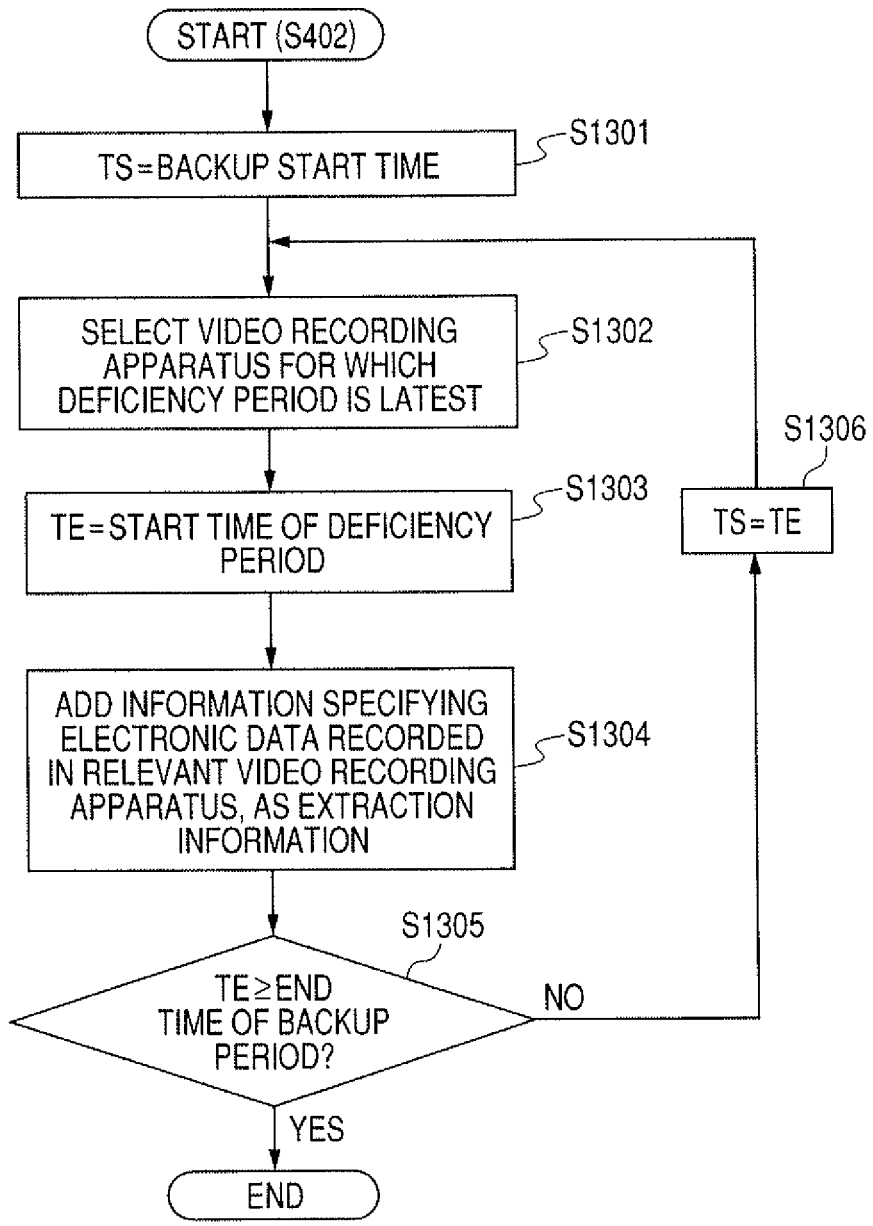
FIG. 13, indicating the second embodiment of the present invention, is a flow chart indicating an example of a detailed process of the extraction information generating process in the step S402 of FIG. 4.

FIG. 13, indicating the second embodiment of the present invention, is a flow chart indicating an example of a detailed process of the extraction information generating process in the step S402 of FIG. 4.

In the process of the step S402 illustrated in FIG. 4, initially, in a step S1301 of FIG. 13, a control processing unit 122 of the video recording apparatus 120 which performs the backup process performs a process of setting a process (extraction) start time (TS) as the start time of the backup process.

Subsequently, in a step S1302, the control processing unit 122 of the video recording apparatus 120 which performs the backup process performs a process of selecting, from the plural video recording apparatuses 120, the video recording apparatus in which the period after the process start time (TS) including deficiency is latest. That is, in the present embodiment, the video recording apparatus in which the interval from the start time (TS) to the period including the deficiency is longest is selected from video recording apparatuses 120-1 and 120-2 which constitute the plural video image recording apparatuses 120 which perform the same operation.

Subsequently, in a step S1303, the control processing unit 122 of the video recording apparatus 120 which performs the backup process performs a process of setting an end time (TE) of the process (extraction) as the start time of the deficiency period in the first video recording apparatus selected in the step S1302.

Subsequently, in a step S1304, the control processing unit 122 of the video recording apparatus 120 which performs the backup process performs a process of adding the information for specifying the electronic data recorded in the video recording apparatus selected in the step S1302, as the extraction information. More specifically, the information from the start time (TS) to the end time (TE) indicating the time zone of the electronic data to be subjected to the backup process, and the information (video recording apparatus ID) for specifying the video recording apparatus selected in the step S1302 are added as the extraction information.

Subsequently, in a step S1305, the control processing unit 122 of the video recording apparatus 120 which performs the backup process judges whether or not the end time (TE) is the same as or later than the end time of the period of the backup process.

If it is judged in the step S1305 that the end time (TE) is not the same as or later than the end time of the period of the backup process (NO in the step S1305), the flow advances to a step S1306. In the step S1306, the control processing unit 122 of the video recording apparatus 120 which performs the backup process performs a process of setting the end time (TE) as the process start time (TS). After then, the flow returns to the step S1302, and the processes in the step S1302 and the following steps are performed again.

As just described, in the first step S1302, the process of selecting, from the plural video recording apparatuses 120, the video recording apparatus in which the interval from the start time of the period of the backup process to the deficiency period is longest is performed. After then, the processes in the steps S1302 to S1306 are repeatedly performed, whereby the video recording apparatus which is different from the relevant selected video recording apparatus and in which the interval from the start time of the deficiency period in the relevant selected video recording apparatus to the deficiency period in the own apparatus is longest is repeatedly selected subsequently.

On the other hand, if it is judged in the step S1305 that the end time (TE) is the same as or later than the end time of the period of the backup process (YES in the step S1305), the process in this flow chart ends.

In any case, the extraction information generating process in the step S402 of FIG. 4 is performed through the above-described processes in the steps S1301 to S1306.

Incidentally, the extraction information which is generated by the processes in the flow chart of FIG. 13 is equivalent to, for example, the extraction information 500 illustrated in FIG. 5.

In the example illustrated in FIG. 5, in regard to the video recording apparatus (that is, the first video recording apparatus) specified by SS1 of the video recording apparatus ID, the period from "2007/11/19 10:15:31.25" and the period from "2007/11/19 15:30:00.42" are the periods respectively having the electronic data including deficiencies. Further, in regard to the video recording apparatus (that is, the second video recording apparatus) specified by SS2 of the video recording apparatus ID, the period from "2007/11/19 13:21:56.33" is the period having the electronic data including deficiency. As just described, in the present embodiment, the video recording apparatus for extracting the electronic data is changed for each period having the electronic data including deficiency.

Subsequently, the reproduction order information generating process in the step S404 of FIG. 4 will be described in detail.

Figure 14:
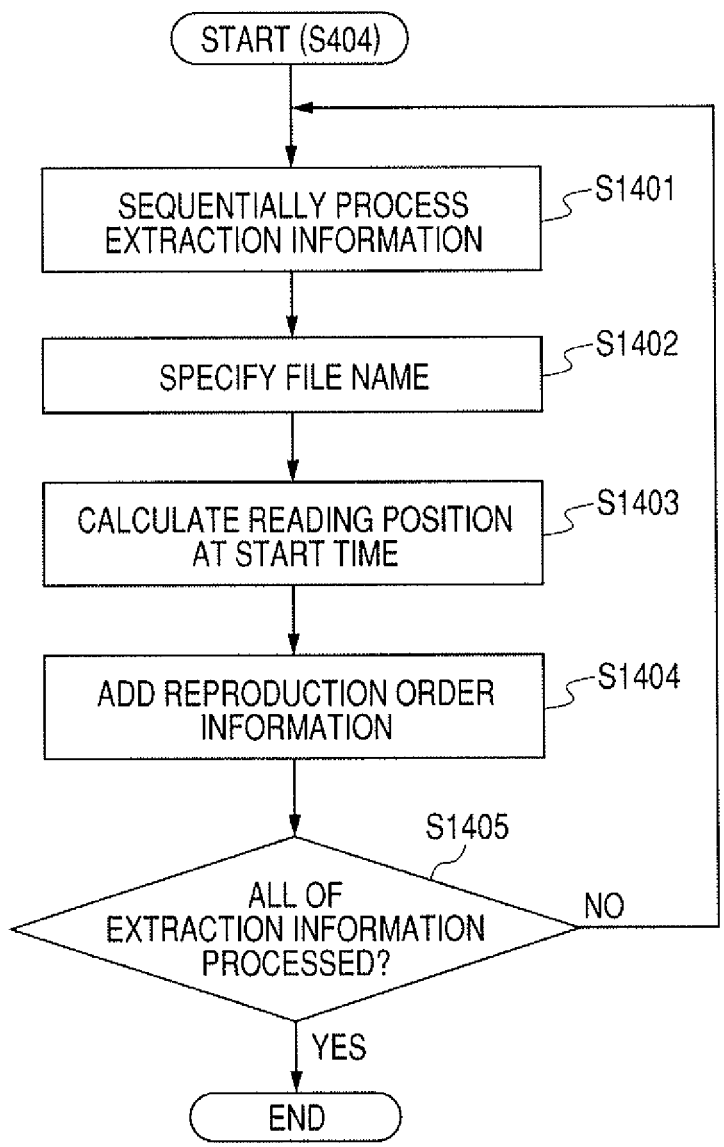
FIG. 14, indicating the second embodiment of the present invention, is a flow chart indicating an example of a detailed process of the reproduction order information generating process in the step S404 of FIG. 4.

FIG. 14, indicating the second embodiment of the present invention, is a flow chart indicating an example of a detailed process of the reproduction order information generating process in the step S404 of FIG. 4.

In the reproduction order information generating process in the step S404 of FIG. 4, initially in a step S1401 of FIG. 14, the control processing unit 122 of the video recording apparatus 120 which performs the backup process sequentially processes the extraction information generated in the process of the flow chart illustrated in FIG. 13.

Subsequently, in a step S1402, the control processing unit 122 of the video recording apparatus 120 which performs the backup process specifies the file name stored in the corresponding storage apparatus 130 from the information indicating the start time, the information indicating the end time and the information indicating the video recording apparatus ID, on the basis of the extraction information.

Subsequently, in a step S1403, the control processing unit 122 of the video recording apparatus 120 which performs the backup process calculates the position of the electronic data (video data) portion at the start time in the file of the file name specified in the step S1402. That is, the reading position of the relevant file is calculated in this step.

Subsequently, in a step S1404, the control processing unit 122 of the video recording apparatus 120 which performs the backup process performs a process of adding the reproduction order information. More specifically, the start time and the end time respectively indicated by the extraction information, the file name specified in the step S1402, and the reading position calculated in the step S1403 are together added to the reproduction order information.

Subsequently, in a step S1405, the control processing unit 122 of the video recording apparatus 120 which performs the backup process judges whether or not the process is performed for the overall extraction information.

Then, if it is judged in the step S1405 that the process is not performed for the overall extraction information (NO in the step S1405), the flow returns to the step S1401. Thus, the processes in the step S1401 and the following steps are performed again.

On the other hand, if it is judged in the step S1405 that the process is performed for the overall extraction information (YES in the step S1405), the process in this flow chart ends.

In any case, the reproduction order information generating process in the step S404 of FIG. 4 is performed through the above-described processes in the steps S1401 to S1405. As well as the first embodiment, the generated reproduction order information is stored together with the video data in the storage apparatus 130. Then, the reproducing apparatus 150 causes the display unit to display the video data by referring to the reproduction order information.

Incidentally, the reproduction order information which is generated by the processes in the flow chart of FIG. 14 is equivalent to, for example, the reproduction order information 600 illustrated in FIG. 6.

Subsequently, the third embodiment of the present invention will be described.

The overall configuration of an electronic data recording system according to the third embodiment is the same as the overall configuration of the electronic data recording system 100 according to the first embodiment illustrated in FIG. 1. Further, the internal constitution of a video recording apparatus 120 according to the third embodiment is the same as the internal constitution of the video recording apparatus 120 according to the first embodiment illustrated in FIG. 2. Furthermore, a procedure in an electronic data recording process to be performed by the video recording apparatus 120 according to the third embodiment is the same as the procedure in the electronic data recording process to be performed by the video recording apparatus 120 according to the first embodiment illustrated in FIG. 4.

In the third embodiment, the points different from those in the above-described first embodiment will be mainly described, and the descriptions of the points common to those in the first embodiment will be omitted or simplified. More specifically, in the third embodiment, video data which is delivered from the network camera 110 illustrated in FIG. 1 is encoded data such as MPEG-4 (Moving Picture Experts Group 4) data or the like to which inter-frame prediction coding is used.

That is, in the present embodiment, the electronic data includes a group which is composed of information based on a difference between reference data and data previous in time and information based on a difference between data previous in time and data subsequent in time. Further, in the step S402 of FIG. 4 according to the present embodiment, the following processes are performed to continue in time series the electronic data respectively extracted from the two video recording apparatuses 120. More specifically, the extraction information is generated on the premise that the time of the data which is the first reference of the electronic data extracted subsequently in time is set earlier than the last time of the electronic data extracted previously in time. After then, in the step S404 of FIG. 4, the reproduction order information is generated so that, at the time of the data which is the first reference of the extraction data extracted subsequently in time, the extraction data extracted previously in time is switched to the extraction data extracted subsequently in time.

The process in the step S402 of FIG. 4 in the present embodiment will be described in detail with reference to FIG. 15.

Figure 15:
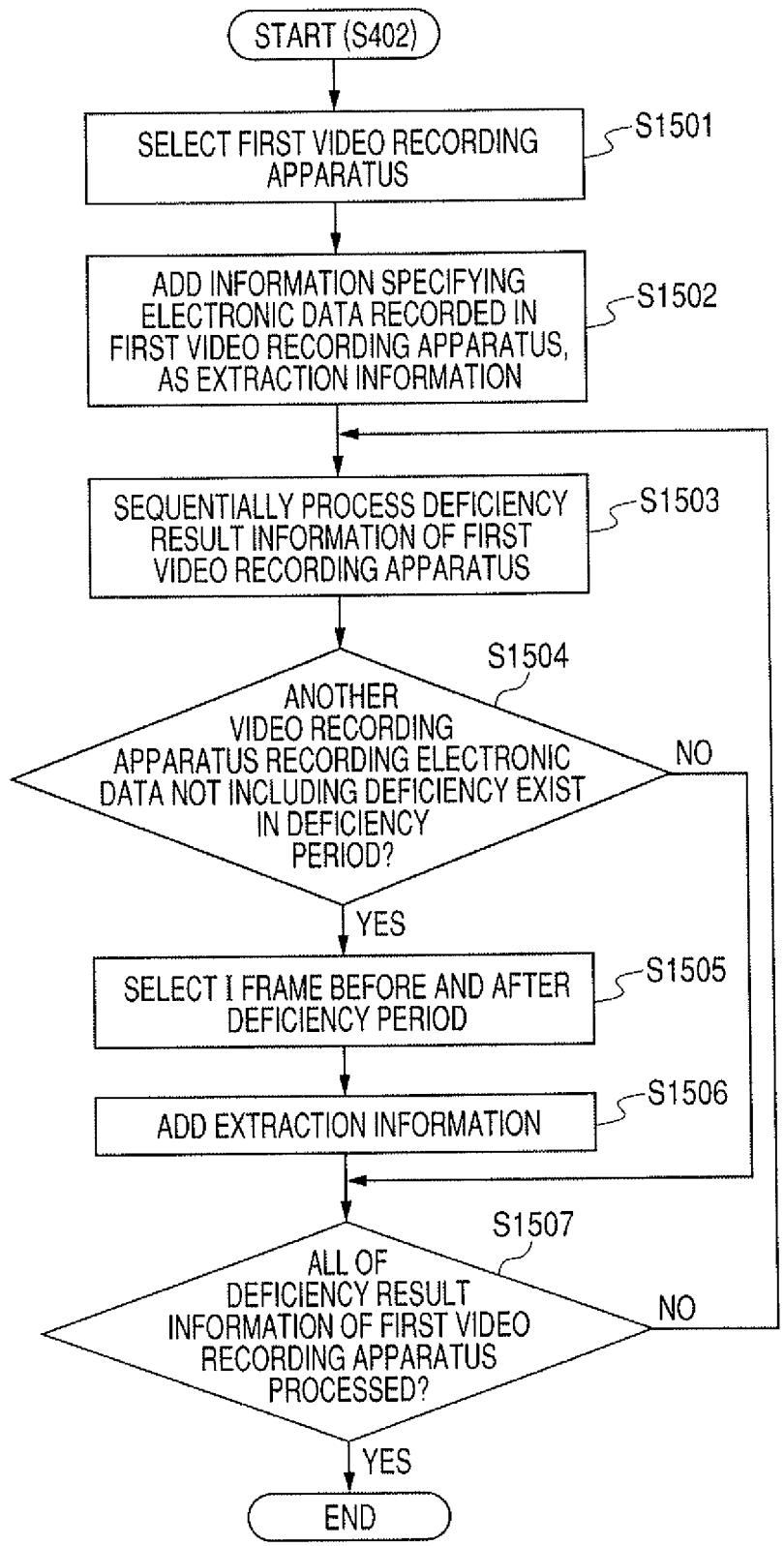
FIG. 15, indicating the third embodiment of the present invention, is a flow chart indicating an example of a detailed process of the extraction information generating process in the step S402 of FIG. 4.

FIG. 15, indicating the third embodiment of the present invention, is a flow chart indicating an example of a detailed process of the extraction information generating process in the step S402 of FIG. 4.

In the extraction information generating process in the step S402 of FIG. 4, initially in a step S1501 of FIG. 15, a control processing unit 122 of the video recording apparatus 120 which performs the backup process performs a process of selecting the first video recording apparatus from the plural video recording apparatuses 120 which perform the same operation. In the present embodiment, as well as the first embodiment, the first video recording apparatus is selected from video recording apparatuses 120-1 and 120-2 which are equivalent to the plural video recording apparatuses 120 which perform the same operation. Further, in the process of selecting the first video recording apparatus in the step S1501, the first aspect to the fifth aspect as described in the first embodiment can be applied.

Subsequently, in a step S1502, the control processing unit 122 of the video recording apparatus 120 which performs the backup process performs a process of adding, as the extraction information, information for specifying the electronic data recorded in the first video recording apparatus selected in the step S1501. More specifically, the information from the start time to the end time of the time zone of the electronic data to be subjected to the backup process, and the information (video recording apparatus ID) for specifying the first video recording apparatus selected in the step S1501 are added as the extraction information.

Subsequently, in a step S1503, the control processing unit 122 of the video recording apparatus 120 which performs the backup process sequentially performs the process for each deficiency period included in the time zone of the backup process, based on deficiency result information in the first video recording apparatus selected in the step S1501.

Subsequently, in a step S1504, the control processing unit 122 of the video recording apparatus 120 which performs the backup process judges whether or not another video recording apparatus which records the electronic data not including deficiency exists in the deficiency period in which the process by the first video recording apparatus is performed.

If it is judged in the step S1504 that another video recording apparatus which records the electronic data not including deficiency exists (YES in the step S1504), the flow advances to a step S1505. In the step S1505, the control processing unit 122 of the video recording apparatus 120 which performs the backup process performs a process of selecting I frames before and after the deficiency period in which the process is performed. More specifically, in the electronic data recorded in the relevant another video recording apparatus, the closest I frame before the start time of the deficiency period in which the process is performed is selected. Further, in the electronic data recorded in the first video recording apparatus, the closest I frame after the end time of the relevant deficiency period is selected.

Subsequently, in a step S1506, the control processing unit 122 of the video recording apparatus 120 which performs the backup process performs a process of adding the extraction information. More specifically, the time of the I frame which is the I frame selected in the step S1505 and is the I frame of another video recording apparatus is set as the start time, and the time of the I frame of the first video recording apparatus is set as the end time. Then, the information of the start time and the information of the end time are added together with the information (video recording apparatus ID) for specifying the relevant another video recording apparatus, as the extraction information.

If the process in the step S1506 ends, or if it is judged in the step S1504 that another video recording apparatus which records the electronic data not including deficiency does not exist (NO in the step S1504), the flow advances to a step S1507. In the step S1507, the control processing unit 122 of the video recording apparatus 120 which performs the backup process judges whether or not the process is performed for all of the deficiency periods based on the deficiency result information of the first video recording apparatus, included in the time zone of the backup process.

Then, if it is judged in the step S1507 that the process is not performed for all of the deficiency periods, that is, if the deficiency result information which is not processed yet exists (NO in the step S1507), the flow returns to the step S1503. Thus, the processes in the step S1503 and the following steps are performed again.

On the other hand, if it is judged in the step S1507 that the process is performed for all of the deficiency periods (YES in the step S1507), the process in this flow chart ends.

In any case, the extraction information generating process in the step S402 of FIG. 4 is performed through the above-described processes in the steps S1501 to S1507.

Subsequently, the fourth embodiment of the present invention will be described.

The overall configuration of an electronic data recording system according to the fourth embodiment is the same as the overall configuration of the electronic data recording system 100 according to the first embodiment illustrated in FIG. 1. Further, the internal constitution of a video recording apparatus 120 according to the fourth embodiment is the same as the internal constitution of the video recording apparatus 120 according to the first embodiment illustrated in FIG. 2. Furthermore, a procedure in an electronic data recording process to be performed by the video recording apparatus 120 according to the fourth embodiment is the same as the procedure in the electronic data recording process to be performed by the video recording apparatus 120 according to the first embodiment illustrated in FIG. 4.

In the fourth embodiment, the points different from those in the above-described second embodiment will be mainly described, and the descriptions of the points common to those in the second embodiment will be omitted or simplified. More specifically, in the fourth embodiment, video data which is delivered from the network camera 110 illustrated in FIG. 1 is encoded data such as MPEG-4 data or the like to which inter-frame prediction coding is used.

Figure 16:
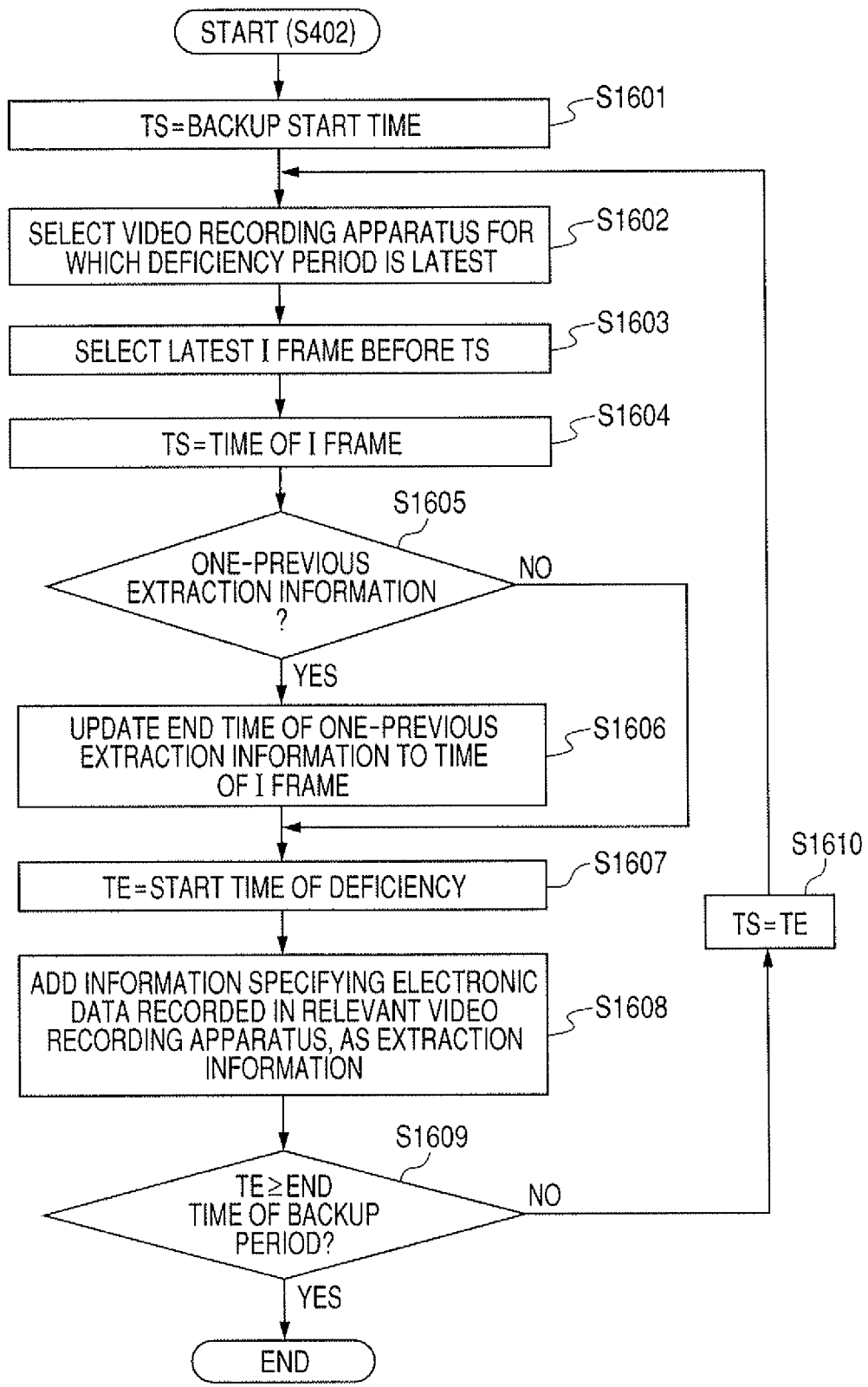
FIG. 16, indicating the fourth embodiment of the present invention, is a flow chart indicating an example of a detailed process of the extraction information generating process in the step S402 of FIG. 4.

FIG. 16, indicating the fourth embodiment of the present invention, is a flow chart indicating an example of a detailed process of the extraction information generating process in the step S402 of FIG. 4.

In the process of the step S402 illustrated in FIG. 4, initially, in a step S1601 of FIG. 16, a control processing unit 122 of the video recording apparatus 120 which performs the backup process performs a process of setting a process (extraction) start time (TS) as the start time of the backup process.

Subsequently, in a step S1602, the control processing unit 122 of the video recording apparatus 120 which performs the backup process performs a process of selecting, from the plural video recording apparatuses 120, the video recording apparatus in which the period after the process start time (TS) including deficiency is latest. That is, in the present embodiment, the video recording apparatus in which the interval from the start time (TS) to the period including the deficiency is longest is selected from video recording apparatuses 120-1 and 120-2 which constitute the plural video image recording apparatuses 120 which perform the same operation.

Subsequently, in a step S1603, the control processing unit 122 of the video recording apparatus 120 which performs the backup process performs a process of selecting a closest I frame before the start time (TS), in the electronic data recorded in the video recording apparatus selected in the step S1602.

Subsequently, in a step S1604, the control processing unit 122 of the video recording apparatus 120 which performs the backup process updates the start time (TS) as the time of the I frame selected in the step S1603.

Subsequently, in a step S1605, the control processing unit 122 of the video recording apparatus 120 which performs the backup process judges whether or not one-previous extraction information added exists.

If it is judged in the step S1605 that the one-previous extraction information added exists, the flow advances to a step S1606. In the step S1606, the control processing unit 122 of the video recording apparatus 120 which performs the backup process changes or updates the end time of the one-previous extraction information to the time of the I frame selected in the step S1603.

If the process in the step S1606 ends, or if it is judged in the step S1605 that the one-previous extraction information added does not exist (NO in the step S1605), the flow advances to a step S1607. In the step S1607, the control processing unit 122 of the video recording apparatus 120 which performs the backup process sets an end time (TE) of the process (extraction) to the start time of the deficiency of the video recording apparatus selected in the step S1602.

Subsequently, in a step S1608, the control processing unit 122 of the video recording apparatus 120 which performs the backup process performs a process of adding the information for specifying the electronic data recorded in the video recording apparatus selected in the step S1602, as the extraction information. More specifically, the start time (TS) is set as the start time, and the end time (TE) is set as the end time. Then, the information of the start time and the information of the end time are added together with the information (video recording apparatus ID) for specifying the video recording apparatus selected in the step S1602, as the extraction information.

Subsequently, in a step S1609, the control processing unit 122 of the video recording apparatus 120 which performs the backup process judges whether or not the end time (TE) is the same as or later than the end time of the period of the backup process.

If it is judged in the step S1609 that the end time (TE) is not the same as or later than the end time of the period of the backup process (NO in the step S1609), the flow advances to a step S1610. In the step S1610, the control processing unit 122 of the video recording apparatus 120 which performs the backup process performs a process of setting the end time (TE) as the process start time (TS). After then, the flow returns to the step S1602, and the processes in the step S1602 and the following steps are performed again.

On the other hand, if it is judged in the step S1609 that the end time (TE) is the same as or later than the end time of the period of the backup process (YES in the step S1609), the process in this flow chart ends.

According to the above-described embodiments of the present invention, it is possible to secure maintainability of the electronic data and also achieve reduction of the capacity necessary for the storage medium to which the electronic data is copied.

Moreover, since the electronic data not including the deficiency period is stored in the storage apparatus 130, it is possible, in case of reproducing the electronic data, to obtain the electronic data without changing over sessions.

Incidentally, the respective steps indicated by the flow charts in FIGS. 4, 8, 10 and 13 to 16 respectively showing the control methods of the video recording apparatus 120 according to the above-described embodiments of the present invention can be achieved if the CPU of a computer executes the programs stored in a RAM, a ROM and the like. Here, the programs and a computer-readable storage medium storing these programs are included in the present invention.

More specifically, the above-described programs are recorded on the storage medium such as a CD-ROM, or supplied to the computer through various transmission media. In addition to the CD-ROM, it is possible, as the storage medium for storing the programs, to use a flexible disk, a hard disk, a magnetic tape, a magnetooptical disk, a non-volatile memory card, or the like. On the other hand, it is possible, as the transmission media, to use communication media in a computer network system (a LAN, a WAN such as the Internet, a wireless communication network, or the like) for propagating and supplying program information as carrier waves. Further, it is possible to use a wired line such as an optical fiber or the like, a wireless line, or the like, as the communication media at this time.

The present invention is not limited to the aspect that the functions of the video recording apparatus 120 according to the respective embodiments are achieved if the computer executes the supplied programs. That is, also in a case where these programs achieve, in association with an OS (operating system) or other application software functioning on the computer, the functions of the video recording apparatus 120 according to the respective embodiments, the relevant programs are included in the present invention. Further, also in a case where the functions of the video recording apparatus 120 according to the respective embodiments are achieved if all or a part of processes of the supplied programs are performed by a function expansion board or a function expansion unit of the computer, the relevant programs are included in the present invention.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-213292, filed Aug. 21, 2008, which is hereby incorporated by reference herein in its entirety.

What is claimed is:

1. A recording control apparatus which controls recording of data transmitted from a network camera to plural recording units, the recording control apparatus comprising:
a designating unit configured to designate a period of the data transmitted from the network camera to the plural recording units to be recorded in a backup storage unit as backup data;
a first obtaining unit configured to obtain first deficiency information according to a deficiency period of the data transmitted from the network camera and recorded in a first recording unit for the designated period;
a second obtaining unit configured to obtain second deficiency information according to a deficiency period of the data transmitted from the network camera and recorded in a second recording unit for the designated period;
a selection unit configured to select one of the first recording unit and the second recording unit based on the obtained first deficiency information according to the deficiency period of the data recorded in the first recording unit for the designated period and the obtained second deficiency information according to the deficiency period of the data recorded in the second recording unit for the designated period;
a determining unit configured to determine whether data corresponding to the deficiency period of the data recorded in the selected recording unit is recorded in the other recording unit which is not selected by the selection unit;
a third obtaining unit configured to obtain the data corresponding to the deficiency period of the data recorded in the selected recording unit from the other recording unit;
a complementing unit configured to complement the data in the deficiency period of the data recorded in the selected recording unit with the data obtained from the other recording unit by the third obtaining unit; and
a backup unit configured to record the complemented data in the backup storage unit as the backup data.

2. A recording control apparatus according to claim 1, wherein the third obtaining unit obtains data on and after the deficiency period in the selected recording unit from the other recording unit.

3. A recording control apparatus according to claim 1, wherein the first obtaining unit obtains the first deficiency information generated according to a setting value concerning a reception rate of the data set in the first recording unit and the reception rate of the data received by the first recording unit.

4. A recording control apparatus according to claim 1, wherein the first obtaining unit obtains the first deficiency information based on information concerning a connection error between the network camera and the first recording unit.

5. A recording control apparatus according to claim 1, further comprising a generation unit, wherein in a case where a first file including first data of a non-deficient period in the first recording unit and a second file including second data, being the data subsequent to the first data, of a non-deficient period in the second recording unit are recorded, the generation unit generates reproduction order information so that the second file is reproduced next to the first file.

6. A recording control apparatus according to claim 1, wherein the selection unit selects from the first and second recording units, the recording unit in which the deficiency period of the data is shorter.

7. A recording control apparatus according to claim 1, wherein the selection unit selects from the first and second recording units, the recording unit in which the number of deficiency periods of the data is smaller.

8. A recording control apparatus according to claim 1, wherein the selection unit selects from the first and second recording units, the recording unit of which a load is lower.

9. A recording control apparatus according to claim 1, wherein the selection unit selects from among the first recording unit, the second recording unit and a third recording unit respectively recording the data transmitted from the network camera, the recording unit in which a period from a recording start to a first deficiency period is longest, and selects, from the two remaining unselected recording units, the recording unit in which a period from the first deficiency period to a next deficiency period is longer as an obtaining destination of the data on and after the first deficiency period in the firstly selected recording unit,
  wherein the third obtaining unit obtains the data in the period from the recording start to the first deficiency period recorded by the firstly selected recording unit and the data on and after the first deficiency period recorded by the secondly selected recording unit selected as the obtaining destination of the data on and after the first deficiency period.

10. A recording control method performed by a recording control apparatus which controls recording of data transmitted from a network camera to plural recording units, the recording control method comprising:
  designating a period of the data transmitted from the network camera to the plural recording units to be recorded in a backup storage unit as backup data;
  obtaining first deficiency information according to a deficiency period of the data transmitted from the network camera and recorded in a first recording unit for the designated period;
  obtaining second deficiency information according to a deficiency period of the data transmitted from the network camera and recorded in a second recording unit for the designated period;
  selecting one of the first recording unit and the second recording unit based on the obtained first deficiency information according to the deficiency period of the data recorded in the first recording unit for the designated period and the obtained second deficiency information according to the deficiency period of the data recorded in the second recording unit for the designated period;
  determining whether data corresponding to the deficiency period of the data recorded in the selected recording unit is recorded in the other recording unit which is not selected;
  obtaining the data corresponding to the deficiency period of the data recorded in the selected recording unit from the other recording unit;
  complementing the data in the deficiency period of the data recorded in the selected recording unit with the data obtained from the other recording unit; and
  recording the complemented data in the backup storage unit as the backup data.

11. A recording control method according to claim 10, wherein the obtaining of the data corresponding to the deficiency period obtains the data on and after the deficiency period in the selected recording unit from the other recording unit.

12. A recording control method according to claim 10, wherein the obtained first deficiency information is generated according to a setting value concerning a reception rate of the data set in the first recording unit and the reception rate of the data received by the first recording unit.

13. A recording control method according to claim 10, wherein the first deficiency information is obtained based on information concerning a connection error between the network camera and the first recording unit.

14. A recording control method according to claim 10, wherein in a case where a first file including first data of a non-deficient period in the first recording unit and a second file including second data, being the data subsequent to the first data, of a non-deficient period in the second recording unit are recorded, reproduction order information is generated so that the second file is reproduced next to the first file.

15. A recording control method according to claim 10, wherein a recording unit in which the deficiency period of the data is shorter is selected from the first and second recording units.

16. A recording control method according to claim 10, wherein a recording unit in which the number of deficiency periods of the data is smaller is selected from the first and second recording units.

17. A recording control method according to claim 10, wherein a recording unit of which a load is lower is selected from the first and second recording units.

18. A recording control method according to claim 10, wherein a recording unit in which a period from a recording start to a first deficiency period is longest is selected from among the first recording unit, the second recording unit and a third recording unit respectively recording the data transmitted from the network camera, and a recording unit in which a period from the first deficiency period to a next deficiency period is longer is selected from the two remaining unselected recording units as an obtaining destination of the data on and after the first deficiency period in the firstly selected recording unit,
  wherein it is controlled to obtain the data in the period from the recording start to the first deficiency period recorded by the firstly selected recording unit and to obtain the data on and after the first deficiency period recorded by the secondly selected recording unit selected as the obtaining destination of the data on and after the first deficiency period.

19. A non-transitory computer readable storage medium which stores code of a program executable by a computer for controlling recording of data transmitted from a network camera to plural recording units, the program comprising:
  a designating process of designating a period of the data transmitted from the network camera to the plural recording units to be recorded in a backup storage unit as backup data;
  a first obtaining process of obtaining first deficiency information according to a deficiency period of the data transmitted from the network camera and recorded in a first recording unit for a designated period;
  a second obtaining process of obtaining second deficiency information according to a deficiency period of the data transmitted from the network camera and recorded in a second recording unit for the designated period;
  a selecting process of selecting one of the first recording unit and the second recording unit based on the obtained first deficiency information according to the deficiency period of the data recorded in the first recording unit for the designated period and the obtained second deficiency information according to the deficiency period of the data recorded in the second recording unit for the designated period;
  a determining process of determining whether data corresponding to the deficiency period of the data recorded in the selected recording unit is recorded in the other recording unit which is not selected by the selecting process;
  a third obtaining process of obtaining the data corresponding to the deficiency period of the data recorded in the selected recording unit from the other recording unit;
  a complementing process of complementing the data in the deficiency period of the data recorded in the selected recording unit with the data obtained from the other recording unit; and
  a recording process of recording the complemented data in the backup storage unit as the backup data.

20. A recording control apparatus according to claim 1, wherein the first obtaining unit obtains the first deficiency information representing the deficiency period defined by whether a connection is established between the network camera and the first recording unit.

21. A non-transitory computer readable storage medium according to claim 19, wherein the first obtaining process obtains the first deficiency information representing the deficiency period defined by whether a connection is established between the network camera the first recording unit.

22. A recording control apparatus according to claim 1, wherein the determining unit determines whether data corresponding to an I-frame of an inter-frame coded video data of the data recorded in the selected recording unit and corresponding to the deficiency period of the data recorded in the selected recording unit is recorded in the other recording unit.

23. A recording control method according to claim 10, wherein the determining step determines whether data corresponding to an I-frame of the inter-frame coded video data of the data recorded in the selected recording unit and corresponding to the deficiency period of the data recorded in the selected recording unit is recorded in the other recording unit.

24. A non-transitory computer readable storage medium according to claim 19, wherein the determining process determines whether data corresponding to an I-frame of the inter-frame coded video data of the data recorded in the selected recording unit and corresponding to the deficiency period of the data recorded in the selected recording unit is recorded in the other recording unit.

25. A recording control method according to claim 10, wherein the obtaining of the first deficiency information obtains the first deficiency information representing the deficiency period defined by whether a connection is established between the network camera and the first recording unit.

* * * * *